United States Patent [19]

Huang et al.

[11] Patent Number: 5,627,939

[45] Date of Patent: May 6, 1997

[54] SPEECH RECOGNITION SYSTEM AND METHOD EMPLOYING DATA COMPRESSION

[75] Inventors: Xuedong Huang, Redmond; Shenzhi Zhang, Issaquah, both of Wash.

[73] Assignee: Microsoft Corporation, Redmond, Wash.

[21] Appl. No.: 116,900

[22] Filed: Sep. 3, 1993

[51] Int. Cl.[6] .................................................. G10L 9/00
[52] U.S. Cl. ..................... 395/2.65; 395/2.31; 395/2.91; 395/2.94
[58] Field of Search .............................. 395/2, 2.29–2.32, 395/2.65, 2.1, 2.4, 2.64; 381/29–30, 34–35

[56] References Cited

U.S. PATENT DOCUMENTS

| | | | |
|---|---|---|---|
| 4,716,592 | 12/1987 | Ozawa et al. | 395/2 |
| 4,718,087 | 1/1988 | Papamichalis | 395/2.65 |
| 4,727,354 | 2/1988 | Lindsay | 341/106 |
| 4,783,803 | 11/1988 | Baker et al. | 381/42 |
| 4,829,577 | 5/1989 | Kuroda et al. | 381/45 |
| 4,837,831 | 6/1989 | Gillick et al. | 381/43 |
| 4,868,867 | 9/1989 | Davidson et al. | 395/2.32 |
| 4,903,305 | 2/1990 | Gillick et al. | 381/41 |
| 4,914,703 | 4/1990 | Gillick | 381/43 |
| 5,029,212 | 7/1991 | Yosnida | 381/43 |
| 5,274,739 | 12/1993 | Woodard | 395/2.65 |

OTHER PUBLICATIONS

Huang et al., *Hidden Markov Models for Speech Recognition*, (Edinburgh Information Technology Series; 7) Edinburgh University Press, Edinburgh, U.K., 1990, pp. 1–7, 52–53, 78–97, 111–164, 186–233.

*Primary Examiner*—Allen R. MacDonald
*Assistant Examiner*—Michael A. Sartori
*Attorney, Agent, or Firm*—Seed and Berry LLP

[57] ABSTRACT

A data compression system greatly compresses the stored data used by a speech recognition system employing hidden Markov models (HMM). The speech recognition system vector quantizes the acoustic space spoken by humans by dividing it into a predetermined number of acoustic features that are stored as codewords in a vector quantization (output probability) table or codebook. For each spoken word, the speech recognition system calculates an output probability value for each codeword, the output probability value representing an estimated probability that the word will be spoken using the acoustic feature associated with the codeword. The probability values are stored in an output probability table indexed by each codeword and by each word in a vocabulary. The output probability table is arranged to allow compression of the probability of values associated with each codeword based on other probability values associated with the same codeword, thereby compressing the stored output probability. By compressing the probability values associated with each codeword separate from the probability values associated with other codewords, the speech recognition system can recognize spoken words without having to decompress the entire output probability table. In a preferred embodiment, additional compression is achieved by quantizing the probability values into 16 buckets with an equal number of probability values in each bucket. By quantizing the probability values into buckets, additional redundancy is added to the output probability table, which allows the output probability table to be additionally compressed.

26 Claims, 7 Drawing Sheets

UNCOMPRESSED

MODELS

| CODEWORDS | A | B | C | D | E | F | • | • | • | Z |
|---|---|---|---|---|---|---|---|---|---|---|
| 1 | 20 | 21 | 20 | 0 | 0 | 0 | | | | 0 |
| 2 | 28 | 30 | 25 | 0 | 0 | 0 | | | | 0 |
| 3 | 35 | 33 | 31 | 0 | 0 | 0 | | | | 0 |
| 4 | 0 | 0 | 0 | 0 | 18 | 21 | | | | 0 |
| 5 | 0 | 0 | 0 | 0 | 28 | 30 | | | | 0 |
| 6 | 0 | 0 | 0 | 76 | 33 | 33 | | | | 0 |
| 7 | 0 | 0 | 0 | 70 | 0 | 15 | | | | 0 |
| 8 | 57 | 51 | 55 | 54 | 0 | 0 | | | | 0 |
| 9 | 54 | 54 | 51 | 48 | 0 | 0 | | | | 0 |
| 10 | 0 | 10 | 20 | 0 | 0 | 0 | | | | 0 |
| 11 | 0 | 0 | 0 | 0 | 0 | 0 | | | | 0 |
| 12 | 0 | 0 | 0 | 0 | 0 | 0 | | | | 33 |
| 13 | 0 | 0 | 0 | 0 | 0 | 0 | | | | 36 |
| 14 | 0 | 0 | 0 | 0 | 0 | 0 | | | | 41 |
| 15 | 0 | 0 | 0 | 0 | 0 | 0 | | | | 55 |
| • | | | | | | | | | | |
| • | | | | | | | | | | |
| • | | | | | | | | | | |
| 200 | 0 | 0 | 0 | 80 | 0 | 0 | | | | 0 |

COMPRESSED

UNCOMPRESSED

MODELS

|  | A | B | C | D | E | F | • | • | • | Z |
|---|---|---|---|---|---|---|---|---|---|---|
| 1 | 3 | 3 | 3 | 0 | 0 | 0 |  |  |  | 0 |
| 2 | 4 | 4 | 4 | 0 | 0 | 0 |  |  |  | 0 |
| 3 | 5 | 5 | 5 | 0 | 0 | 0 |  |  |  | 0 |
| 4 | 0 | 0 | 0 | 0 | 2 | 3 |  |  |  | 0 |
| 5 | 0 | 0 | 0 | 0 | 4 | 4 |  |  |  | 0 |
| 6 | 0 | 0 | 0 | 12 | 5 | 5 |  |  |  | 0 |
| 7 | 0 | 0 | 0 | 11 | 0 | 2 |  |  |  | 0 |
| 8 | 9 | 8 | 8 | 8 | 0 | 0 |  |  |  | 0 |
| 9 | 8 | 8 | 8 | 7 | 0 | 0 |  |  |  | 0 |
| 10 | 0 | 1 | 3 | 0 | 0 | 0 |  |  |  | 0 |
| 11 | 0 | 0 | 0 | 0 | 0 | 0 |  |  |  | 0 |
| 12 | 0 | 0 | 0 | 0 | 0 | 0 |  |  |  | 5 |
| 13 | 0 | 0 | 0 | 0 | 0 | 0 |  |  |  | 5 |
| 14 | 0 | 0 | 0 | 0 | 0 | 0 |  |  |  | 6 |
| 15 | 0 | 0 | 0 | 0 | 0 | 0 |  |  |  | 8 |
| • |  |  |  |  |  |  |  |  |  |  |
| • |  |  |  |  |  |  |  |  |  |  |
| • |  |  |  |  |  |  |  |  |  |  |
| 200 | 0 | 0 | 0 | 12 | 0 | 0 |  |  |  | 0 |

CODEWORDS

COMPRESSED

INPUT CODEWORD STRING = 12, 8, 10, 4.

COMPRESSED
12=<0,6>, ..., 5.
8=9, <8,3>, <0,2>, ..., 0.
10=0, 1, 3, <0,3>, ..., 0.
4=<0,4>, 2, 3, ..., 0.

|    | W(A) | W(B)        | W(C)        | W(D) | W(E) | W(F) | . | . | . | W(Z) |
|----|------|-------------|-------------|------|------|------|---|---|---|------|
| 12 | 0    | 0           | 0           | 0    | 0    | 0    |   |   |   | $5T_1$ |
| 8  | $9T_2$ | $8T_2$    | $8T_2$      | $8T_2$ | 0  | 0    |   |   |   | 0    |
| 10 | 0    | $8T_2+1T_3$ | $8T_2+3T_3$ | 0    | 0    | 0    |   |   |   | 0    |
| 4  | 0    | 0           | 0           | 0    | $2T_4$ | $3T_4$ |   |   |   | 0  |

*Fig. 7*

SPEECH RECOGNITION SYSTEM AND METHOD EMPLOYING DATA COMPRESSION

TECHNICAL FIELD

The present invention relates to speech recognition using hidden Markov models, and more particularly, to a data compression system for compressing the hidden Markov models.

BACKGROUND OF THE INVENTION

Under present technology, human input into computers usually involves typing in instructions or data with a keyboard or pointing to meaningful areas of the computer display unit with a pointing device such as a mouse. However, most people are much more comfortable communicating using speech. Speech communications are particularly important in places where the written language is very difficult to input into a computer, such as Chinese or Kanji. Consequently, the development of a speech recognizer for a computer would greatly expand the useability and the usefulness of computers.

Many computer speech recognizers have been developed with varying success. Difficulties in recognizing speech arise from acoustic differences occurring each time a word is spoken. These acoustic differences can be caused by differences in each speaker's accent, speaking speed, loudness and vocal quality. Even a single word spoken by a single speaker varies acoustically due to changes in the speaker, such as health or stress levels, or changes in the speaker's environment, such as background noise and room acoustics.

One prior art speech recognition system that has achieved some success is the hidden Markov model (HMM) system. In general, HMM systems are based on modeling each speech signal by some well-defined statistical algorithms that can automatically extract knowledge from speech data. The data needed for the HMM statistical models are obtained by numerous training words being spoken together with a typed indication of the words being spoken. Like all statistical methods, the accuracy of the HMM speech recognition systems improves greatly as the number of spoken training words increases. Given the large number of acoustic variables, the number of spoken training words needed to model accurately the spoken words can be quite large. Consequently, the memory needed to store the models necessary to recognize a large vocabulary of words is extensive, e.g., approximately 28 megabytes. As a result, a system for compressing the modeling data would allow more words to be modeled and stored in less space.

In general, HMM speech recognition systems model each word according to output and transitional probability distributions. The output probability distribution refers to the probabilities of the word having each acoustic feature in a set of predefined acoustic features. The transitional probability distribution for the word refers to the probabilities of a predefined portion, known as a state or frame, of the word being followed by either a new state or a repetition of the current state. For example, the word "dog" has a relatively high output probability of including a hard "d" sound. A transitional probability distribution refers to the probability of the "o" sound being repeated in the next frame and the probability of the "g" occurring in the next state. It should be recognized that a word typically includes 40–50 states, much more than the three phones of the "dog" example, but the transitional and output probability distribution concepts are the same.

Prior art HMM speech recognition systems typically employ vector quantization to divide the acoustic space or frequency range spoken by humans into a predetermined number of acoustic feature models that are given labels called "codewords." The output probabilities for each word are represented by probability values for each codeword. Typically, approximately 200 codewords are chosen to allow accurate modeling of the spoken words with minimum distortion caused by an acoustic feature falling between two adjacent acoustic feature models. Because the range of codewords is chosen to represent all of the possible acoustic features of speech, it is highly unlikely that a single word will have a non-zero probability for every codeword. In fact, most words have a non-zero probability value for a minority of the codewords. As a result, the models for most words are stored with a substantial number of repeated zero probability values. These repeated zero probability values take up much storage space with very little relevant information content.

SUMMARY OF THE INVENTION

It is an objective of the present invention to provide a speech recognition system employing compressed hidden Markov models to recognize spoken words.

It is another objective of the present invention to compress output probability values included in the hidden Markov models.

It is still another objective of the present invention to compress the output probability values in a way that does not require all of the output probability values to be decompressed in order to recognize a spoken word.

These and other objectives are satisfied according to a preferred embodiment of the present invention, in which a data compression system greatly compresses the stored data used by a speech recognition system employing hidden Markov models (HMM). The speech recognition system vector quantizes the acoustic space spoken by humans by dividing it into a predetermined number of acoustic features that are stored as codewords in a vector quantization (VQ) table or codebook. For each spoken word, the speech recognition system calculates an output probability value for each codeword, the output probability value representing an estimated probability that the word will be spoken using the acoustic feature associated with the codeword. The probability values are stored in an output probability table indexed by codeword and by each word in a vocabulary. The output probability table is arranged to allow compression of the probability of values associated with each codeword based on other probability values associated with the same codeword, thereby compressing the stored output probability. By compressing the probability values associated with each codeword separate from the probability values associated with other codewords, the speech recognition system can recognize spoken words without having to decompress the entire output probability table. In a preferred embodiment, additional compression is achieved by quantizing the probability values into 16 buckets with an equal number of probability values in each bucket. By quantizing the probability values into buckets, additional redundancy is added to the output probability table, which allows the output probability table to be additionally compressed.

DETAILED DESCRIPTION OF THE INVENTION

According to a preferred embodiment of the present invention, a data compression system greatly compresses the stored data used by a speech recognition system employing hidden Markov models (HMM). The speech recognition system vector quantizes the acoustic space spoken by humans by dividing it into a predetermined number of acoustic features that are stored as codewords in a vector quantization (VQ) table or codebook. For each spoken word, the speech recognition system calculates an output probability value for each codeword, the output probability value representing an estimated probability that the word will be spoken using the acoustic feature associated with the codeword. The probability values are stored in an output probability table indexed by codeword and by each word in a vocabulary. The output probability table is arranged to allow compression of the probability of values associated with each codeword based on other probability values associated with the same codeword, thereby compressing the stored output probability. By compressing the probability values associated with each codeword separate from the probability values associated with other codewords, the speech recognition system can recognize spoken words without having to decompress the entire output probability table. In a preferred embodiment, additional compression is achieved by quantizing the probability values into 16 buckets with an equal number of probability values in each bucket. By quantizing the probability values into buckets, additional redundancy is added to the output probability table, which allows the output probability table to be additionally compressed.

Figure 1:
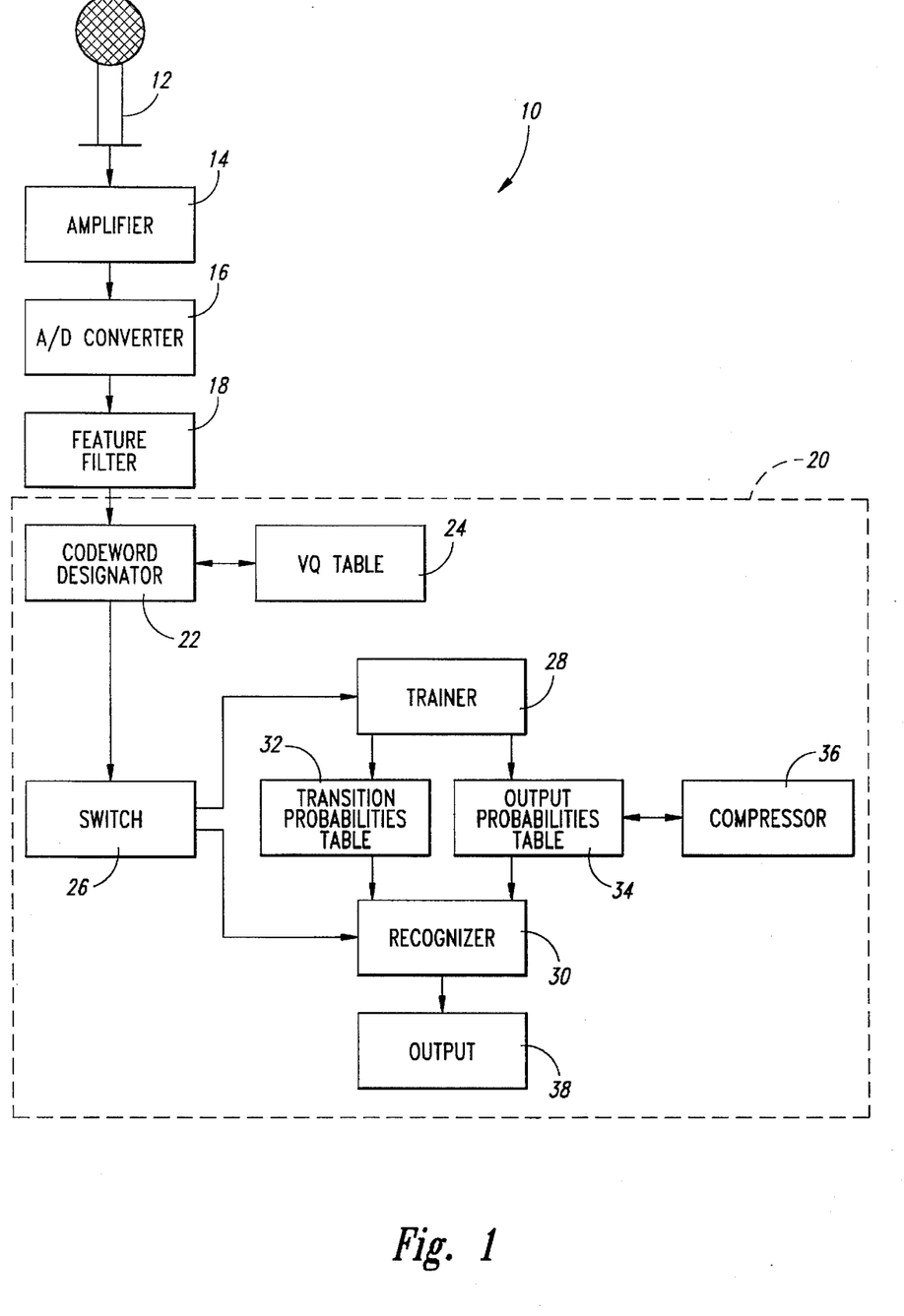
FIG. 1 is a block diagram of a speech recognition system including a data compression system according to a preferred embodiment of the invention.

Shown in FIG. 1 is a speech recognition system 10 that models incoming speech data based on hidden Markov models. A word spoken into a microphone 12 is amplified by an amplifier 14 and passed to an analog/digital (A/D) converter 16. The A/D converter 16 transforms the analog speech signal into a sequence of digital samples, which is supplied to a feature filter 18. The feature filter 18 is a conventional array processor that performs spectral analysis to compute a magnitude value for each frequency of a frequency spectrum. Known methods of spectral analysis include fast Fourier transforms, linear predictive coding, and other acoustic parameterizations such as cepstral coefficients. Preferably the spectral analysis is performed every 10 milliseconds such that each spoken word is made up of many 10 millisecond frames.

Each frame is transmitted to a data processor 20 which can be any conventional computer such as a desktop personal computer. The data processor 20 includes a codeword designator 22 that receives each input frame and compares the input frame to numerous acoustic feature models represented by codewords in a vector quantization (VQ) table 24.

In a preferred embodiment, there are 200 codewords in the VQ table 24 that are chosen to adequately cover the entire human speaking range. The codeword that most closely matches the acoustic features of the input frame becomes associated with that input frame. As such, the codeword designator 22 outputs a string of codewords for each spoken word with an interval of 10 milliseconds between consecutive codewords. The codeword string is transmitted via a switch 26 to either a trainer 28 or a recognizer 30. The trainer 28 calculates a hidden Markov model for each word and the recognizer 30 uses the hidden Markov models to recognize subsequent occurrences of the same word. The trainer 28 stores the hidden Markov models in memory, the hidden Markov models including a transition probabilities table 32 storing frame transition information and an output probability table 34 storing feature output probabilities for each word. A compressor 36 compresses the probability values in the output probabilities table as described in more detail below. Upon recognizing a spoken word, the recognizer passes the recognized word to an output 38 that displays the recognized word to a user.

Figure 2:
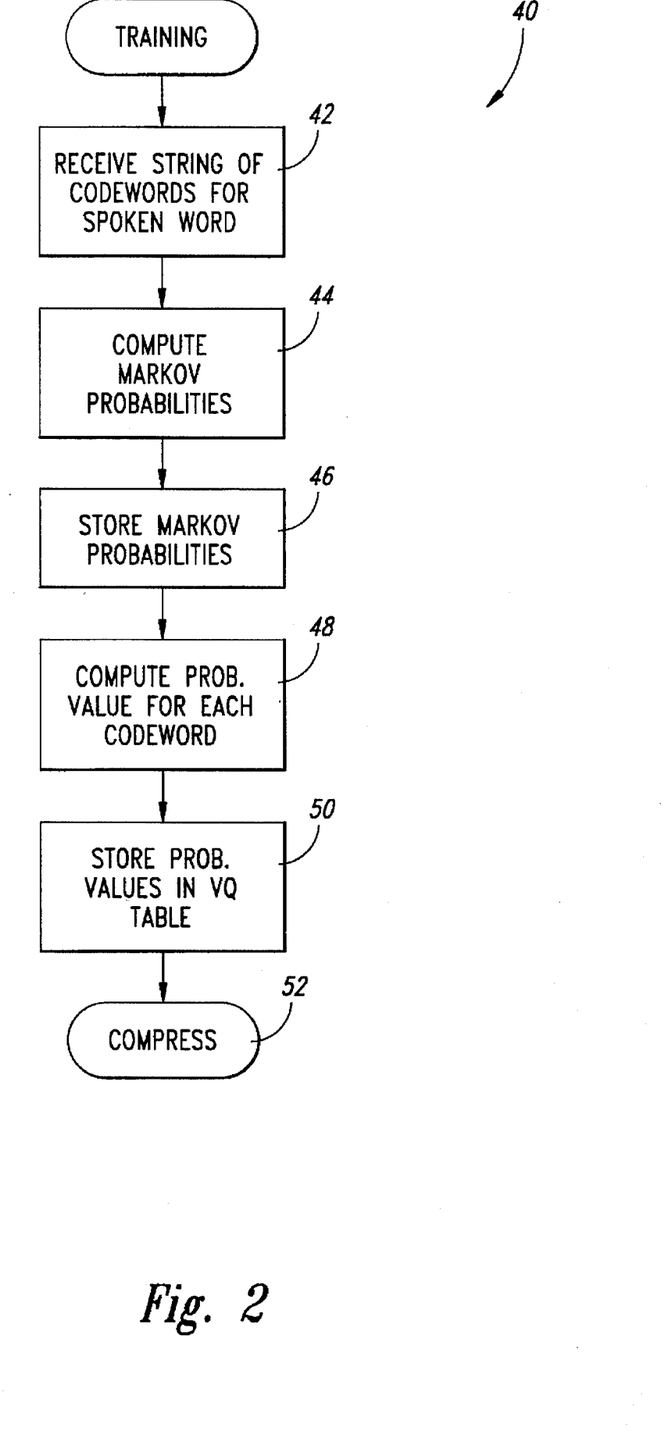
FIG. 2 is a flow diagram of a training method used in connection with the speech recognition system shown in FIG. 1.

Shown in FIG. 2 is a preferred embodiment of a training method 40 employed by the trainer 28 to create one or more hidden Markov models for each word in a vocabulary. The trainer can be easily programmed to create more than one model for each word to accommodate different pronunciations for each word. For example, separate sets of models can represent words spoken with Australian, Southern United States, and Mid-Western United States accents, respectively.

In step 42, the trainer 28 receives a string of codewords for a spoken word from the codeword designator 22 via the switch 26. Based on the codeword string, the trainer 28 computes transition probabilities for the transitions between the frames or states of the codeword string (step 44) and stores the transition probabilities in the transition probability table 32 in step 46. In step 48, the trainer 26 computes an output probability value for each codeword in the codeword string and stores the probability values for each codeword produced for the spoken word in the output probability table 34 in step 50. The computations of the transition and output probabilities are well known in the speech recognition art and generally in the statistics art. Obviously, the probability computations become more meaningful as the number of times that the word is trained increases.

In order to understand the importance of the output probability table 34, a discussion of the prior art methods of storing output probabilities may be helpful. Prior art HMM speech recognition systems store each hidden Markov model (including the output probability values) for a word separately from all other hidden Markov models, including other hidden Markov models of the same word, if any. For example, assuming that there are 200 codewords in the VQ table, a prior art hidden Markov model for a word "a" may include probability values 20, 28, 35, 0, 0, 0, 0, 57, 54, . . . , 0 (percent values) for codewords 1–9, . . . 200. The output probabilities can be compressed by replacing identical repeated probability values for successive codewords by a compression code representing the replaced probability values. A major problem with such a compression scheme is that the compressed probability values of every modeled word must be decompressed before any recognition takes place.

Figure 3:
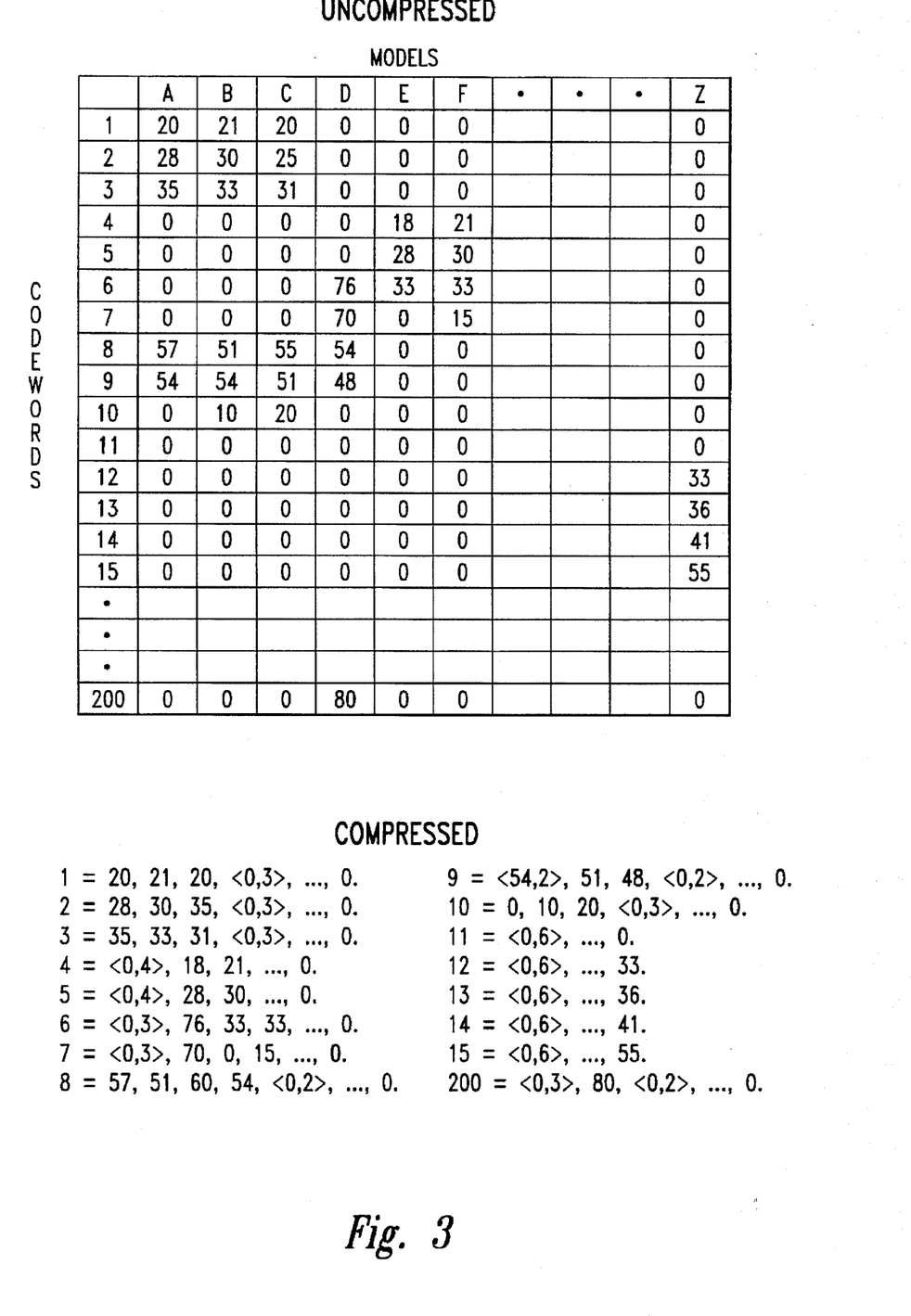
FIG. 3 is a storage diagram of a compression system used with the speech recognition system shown in FIG. 1.

Shown in FIG. 3 is the output probability table 34 with exemplary probability values before and after being compressed according to the present invention. Each column of the uncompressed table 34A corresponds to a hidden Markov model for a vocabulary of words A–Z, while the rows correspond to the codeword identifiers 1–200. As discussed above, each word can have more than one hidden Markov model. For example, separate models may be desired for words commonly spoken differently by different speakers, such as the word "either." By grouping the probability values for all of the models in a single table, the probability values for each codeword identifier can be grouped together and compressed as a group.

Figure 4:
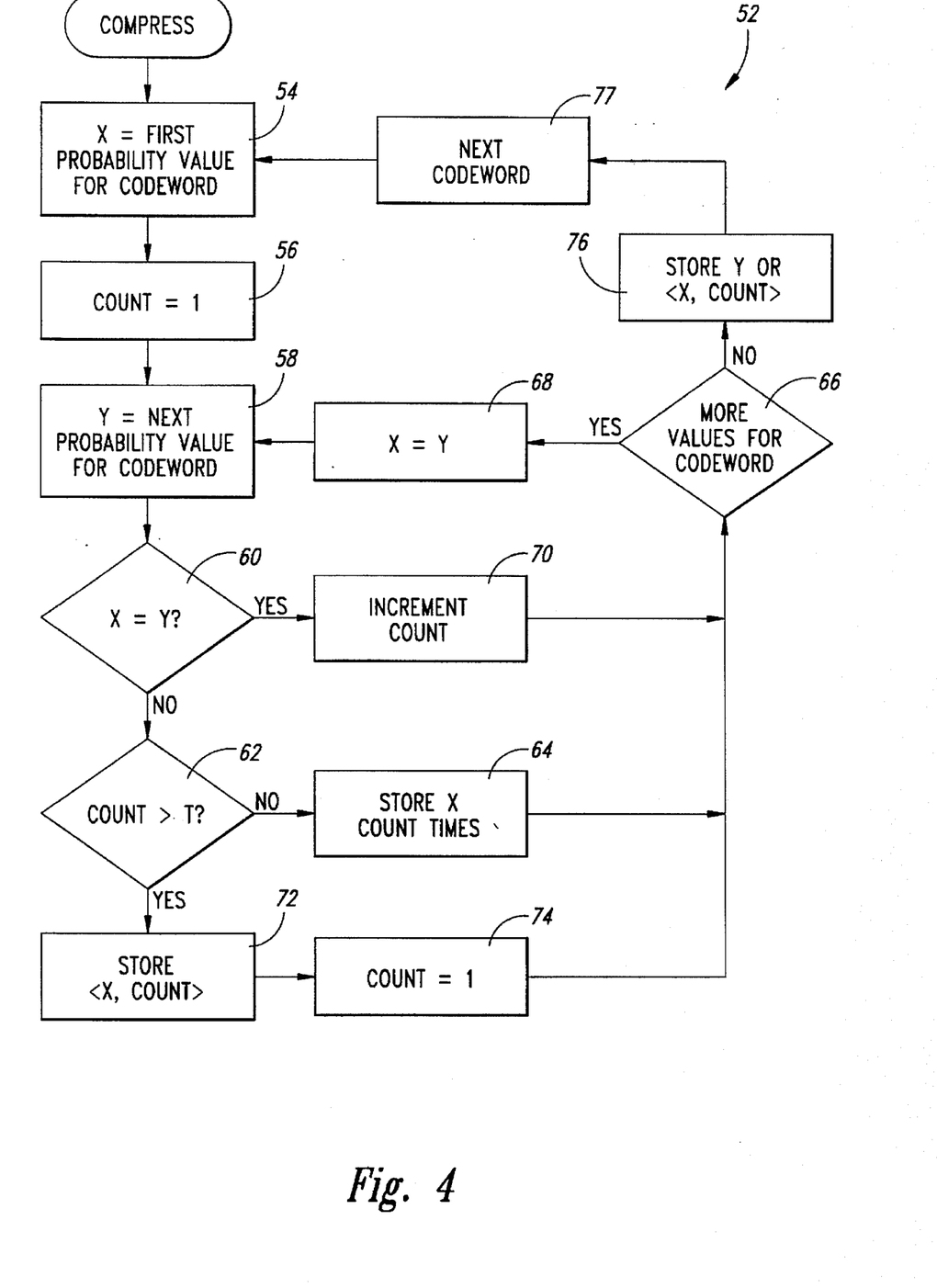
FIG. 4 is a flow diagram of a compression method for a speech recognition system according to the present invention.

Shown in FIG. 4 is a compression method 52 for compressing the probability values for each codeword in the uncompressed output probability table 34A to produce the compressed output probability table 34B shown in FIG. 3. The compression method is a run-length encoding of each codeword, although numerous other compression methods could also be used. In step 54, the compression method sets the first probability value for the codeword equal to a variable X. In step 56, the compression method sets a count value equal to one. In step 58, the next probability value for the codeword is set equal to the variable Y and in step 60, the compression method determines whether X equals Y. In the example for the codeword "1", the first probability value (X) is 20 and the second probability value (Y) is 21, so no match is found in step 60. In step 62, the count value is compared to a threshold value T to determine whether a string of matching values is of a length that is sufficient to justify compressing the string. In a preferred embodiment, the threshold value T equals two, but others may wish to set a higher threshold value such that only longer strings of matching probability values are compressed. Given that a match has yet to be found, the first probability value X (20) is stored in step 64 without being compressed. In step 66, the compression method determines whether there are more probability values for the codeword being compressed. Because there are more values for the codeword 1 in the present example, in step 68 the compression method sets the Y probability value equal to X. Steps 58 through 68 are then repeated for the next two probability values, resulting in the probability values 21 and 20 being stored without being compressed.

After the "C" probability value has been analyzed for the codeword 1, the X value is set equal to the zero of the D column in step 68, and the Y value is set equal to the zero of the E column in step 58. The compression method determines in step 60 that X=Y, so in step 70, the count value is incremented to 2, indicating a run of two matching values. Steps 66, 68, 58, 60 and 70 are repeated for the next probability value (a zero of the F column) resulting in a run of three matching values. Assuming that the probability value following the F column is not a zero, step 60 determines that another match is not found. The compression method determines in step 62 that the count value exceeds the threshold value, so in step 72, the compression method stores a compression code indicating their repeated probability value X (0) and the count value (3). In step 74, the compression method resets the count value to 1 to search for the next run of probability values. When step 66 determines that no more probability values exist for the current codeword, the compression moves on to the next codeword in step 76. Steps 54 through 76 are repeated for each codeword until the entire output probability table 34A has been compressed into the compressed output probability table 34B shown in FIG. 3.

Figure 5:
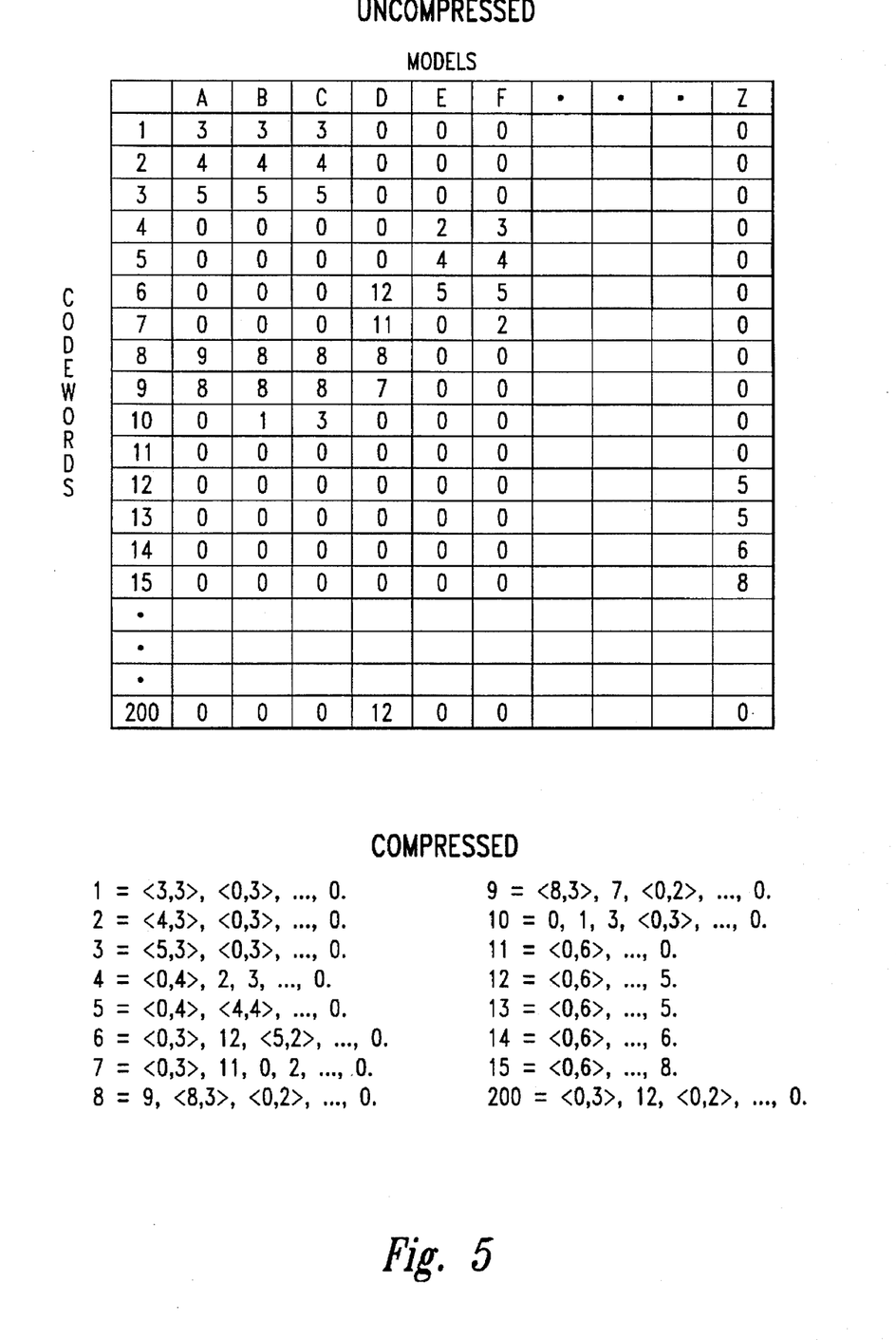
FIG. 5 is a storage diagram of an alternate compression system used with the speech recognition system shown in FIG. 1.

Shown in FIG. 5 is an alternate output probability table 34C for the same probability data shown in FIG. 3. In the alternate embodiment, the probability values are quantized into a predetermined number of buckets, the predetermined number being less than the range of probability values computed. Any number of buckets can be chosen, with 16 being preferable, as each of the numbers 0 through 15 can be expressed using four bits. Alternatively, one can use fewer buckets for greater compression and more buckets for greater accuracy. The range of each bucket is chosen so that an equal number of probability values is represented by each bucket. For example, if there are numerous small probability values, it may take three buckets to represent probability values from 0 to 5 and one bucket to represent probability values from 75 to 100. Preferably, the range of each bucket is dynamically adjusted based on the distribution of the probability values to ensure that an equal number of probability values is represented by each bucket. In the embodiment shown in FIG. 5, the probability values are assumed to be equally distributed from 0 to 100 such that each bucket represents an equally sized range of probability values. As can be seen, the quantization of the probability values into buckets produces more identical values than are found in the unquantized output probability table 34A. As a result, when the output probability table 34C is compressed using the compression methods shown in FIG. 4, a compressed probability table 34D is produced that is much more compressed than the compressed unquantized probability table 34B shown in FIG. 3.

After a sufficient number of words has been trained and the output probability table has been compressed, the speech recognition system 10 is ready to recognize a new spoken word. As discussed above, the word is spoken into the microphone 12 and converted into a string of codewords by the amplifier 16, A/D converter 18 and codeword designator 22. The user sets the switch 26 to transmit the codeword string to the recognizer 30 rather than the trainer 28. Alternatively, the codeword string can be sent to the trainer 28 in addition to the recognizer 30 so that the trainer can adapt the hidden Markov models while the word is recognized by the recognizer.

Figure 6:
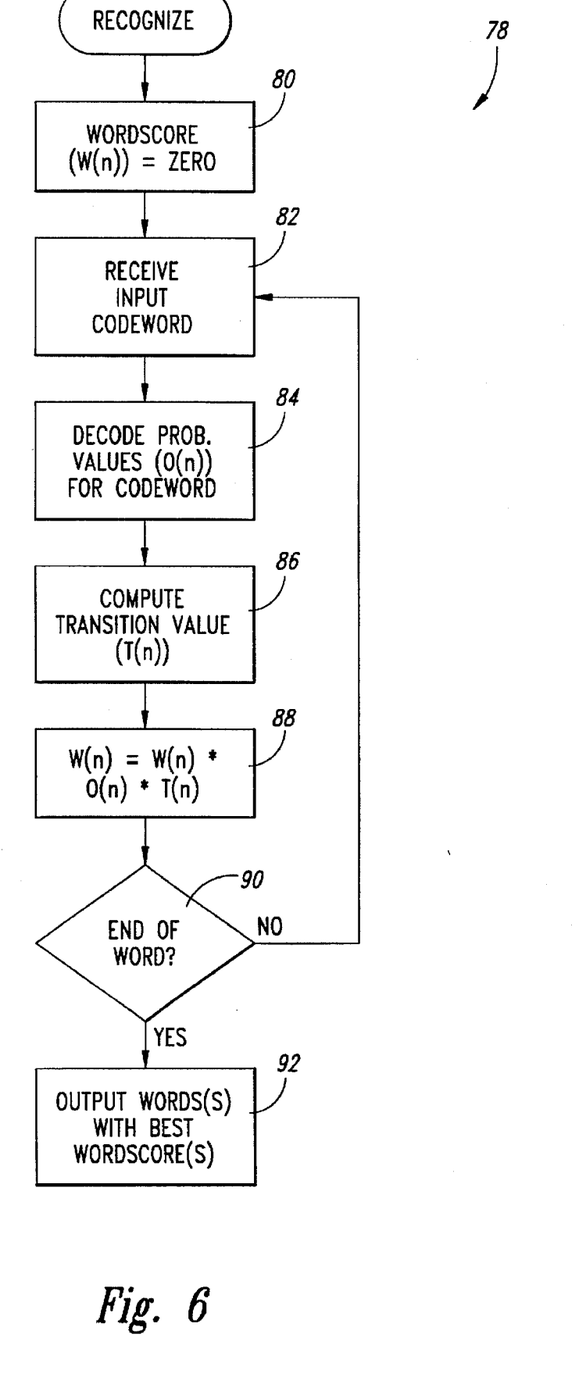
FIG. 6 is a flow diagram of a recognition method used with the speech recognition system shown in FIG. 1.

Shown in FIG. 6 is a method 78 performed by the recognizer 30 (FIG. 1) to recognize a spoken word by determining the hidden Markov model with the highest probability of matching the spoken word. In step 80, the recognizer sets a wordscore (Wn) equal to zero for each hidden Markov model (n). Each wordscore represents the total probability value for each Hidden Markov model that has a greater than zero probability of being the spoken input word. In step 86, the recognizer 30 receives an input codeword corresponding to the first frame of the spoken input word. In step 88, the recognizer decodes the output probability values (O(n)) in the compressed output probability table 34D for the codeword. In step 90, the recognizer computes a transition score (T(n)) for each hidden Markov model. In step 92, for each word model, the recognizer multiplies the transition score by the output probability value for the codeword and multiplies the result to the previously calculated wordscore, resulting in a new wordscore. In step 94, the recognizer determines whether the end of the input word has been reached. If not, then the steps 86 through 94 are repeated for each frame of the input word. When the end of the word has been reached, the recognizer causes the output 38 to display the word with the best wordscore, i.e., the word whose word model is computed to have the highest probability of corresponding to the spoken input word. Optionally, the recognizer can be programmed to output a list of possible matching words whose word models resulted in high wordscores.

Figure 7:
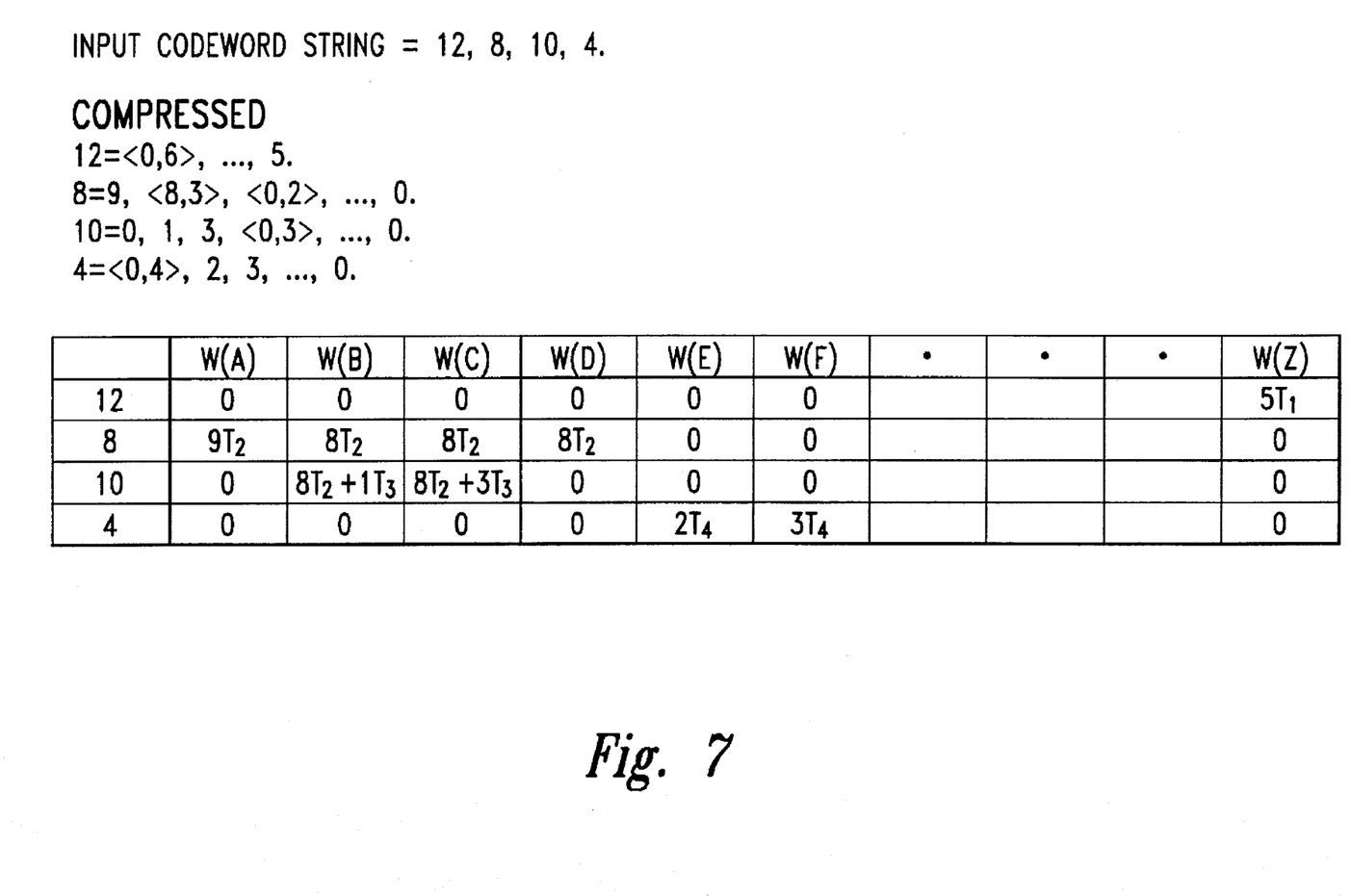
FIG. 7 is a diagram showing an example of a word being recognized according to the speech recognition system shown in FIG. 1.

Shown in FIG. 7 is an example of the recognition method 78 performed on a spoken input word that has been converted in the string of codewords 12, 8, 10, 4 by the codeword designator 22 (FIG. 1). The recognizer 30 receives the first codeword (12) in step 86 and decompresses the probability values associated with that codeword for each hidden Markov model to obtain 0, 0, 0, 0, 0, 0, . . . 5 in step 88. In steps 90, 92, the recognizer computes a transition value $T_{n1}$ (for simplicity, the subscript for each model is not shown in FIG. 7) and a wordscore for each model. It should be recognized that because the compression method identifies repeated probability values, the wordscore value need only be computed once for each run of identical probability values. After decompressing the probability values for each codeword and computing the wordscores for each model the recognizer outputs the word whose model achieved the highest wordscore. It will be appreciated that because each of the models shown have a zero output probability for at least one codeword of the input word, none of the models is a good match. Ordinarily, at least one of the models will have a positive output probability for all of the codewords of the input word.

The method described above for computing a wordscore for each hidden Markov model is a modified version of a well-known algorithm known as the Forward-Backward algorithm described in detail in U.S. Pat. No. 4,829,577 and Huang et al., Hidden Markov Models for Speech Recognition, Edinburgh University Press, 1990, both of which are incorporated by reference. The conventional algorithm is modified to the extent that only the probability values for each codeword found for the input spoken word are decompressed and used to compute the codeword. Other well-known recognition algorithms can also be used with the modification just described, such as the Viterbi algorithm described in the Huang et al. book.

As discussed above, the present invention provides a method and system for highly compressing the hidden Markov models used in a speech recognition system. By compressing the output probability values associated with each codeword separate from the output probability values associated with other codewords, the speech recognition system can recognize spoken words without having to decompress the entire output probability table. Further, by quantizing the probability values into a predetermined number of buckets, the output probability values are additionally compressed. Such compression allows the hidden Markov models to be stored in much less space, such as the 25 megabyte to 2 megabyte compression ratio found by the inventors. Such reduced memory requirements allow the speech recognition system as a whole to use less memory space and allows more words to be modeled and recognized than is possible with prior art speech recognition systems.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A data compression method for a computerized speech recognizer having a plurality of hidden Markov models representing acoustic utterances, comprising:

receiving a plurality of spoken training utterances; and convening the spoken training utterances into a stored output probability table, the convening step including:

creating a predetermined number of codewords based on the spoken training utterances, each codeword representing an acoustic feature of the spoken training utterances;

creating the hidden Markov models based on the spoken training utterances, each hidden Markov model being created by steps that include associating a probability value with each codeword, each probability value reflecting a probability that the acoustic utterance represented by the hidden Markov model will be spoken using the acoustic feature represented by the associated codeword; and compressing at least some of the probability values associated with a selected one of the codewords based on others of the probability values associated with the selected codeword, thereby compressing the stored output probability table.

2. The data compression method of claim 1 wherein the compressing step includes:

counting a number of probability values in a run of consecutive identical probability values associated with the selected codeword; and encoding the run of consecutive identical probability values with an identification code that identifies the consecutive identical probability values and a count code that identifies how many consecutive identical probability values are in the run.

3. The data compression method of claim 1, further including quantizing the probability values into buckets before compressing the probability values associated with each codeword, each bucket representing a range of probability values.

4. The data compression method of claim 3 wherein the quantizing step includes quantizing the probability values into 16 buckets.

5. The data compression method of claim 3, further including dynamically adjusting the ranges of the buckets according to the number of probability values coming within each range.

6. The data compression method of claim 1, further including:

inputting an input speech signal that represents a sound spoken by a user; convening the input speech signal into a string of input frames; associating one of the codewords with each input frame; for each input frame:

decompressing only those probability values associated with a codeword of the stored output probability table that is identical to the codeword of the input frame; and computing a recognition score for each of the hidden Markov models using the decompressed probability values; and determining which hidden Markov model results in a highest recognition score based on the computing step, the acoustic utterance represented by the hidden Markov model with the highest recognition score being recognized as the spoken sound represented by the input speech signal.

7. The data compression method of claim 1, wherein the hidden Markov models represent whole words of a language.

8. A data compression system for a computerized speech recognizer having a plurality of hidden Markov models representing acoustic utterances, comprising:

a receiver that receives a plurality of spoken training utterances;

means for converting the spoken training utterances into an output probability table having a predetermined number of codewords, each codeword representing an acoustic feature of the spoken training utterances and each codeword being associated with a probability value for each hidden Markov model, each probability value reflecting a probability that the acoustic utterance represented by the hidden Markov model will be spoken using the acoustic feature represented by the associated codeword;

a memory that stores the output probability table; and a data processor that compresses at least some of the probability values associated with a selected one of the codewords based on others of the probability values associated with the selected codeword, thereby compressing the stored output probability table.

9. The data compression system of claim 8 wherein the data processor is adapted to compress the probability values using run-length encoding in which a run of consecutive identical probability values is stored as a code that includes an identification of the consecutive identical probability values and a count value that indicates how many consecutive identical probability values are in the run.

10. The data compression system of claim 8, further including means for quantizing the probability values into buckets before compressing the probability values associated with each codeword, each bucket representing a range of probability values.

11. The data compression system of claim 10 wherein the quantizing means includes means for quantizing the probability values into 16 buckets.

12. The data compression system of claim 10, further including means for dynamically adjusting the ranges of the buckets according to the number of probability values coming within each range.

13. The data compression system of claim 8, wherein the receiving means receives an input speech signal that represents a sound spoken by a user and the convening means includes means for convening the input speech signal into a string of input frames and means for associating one of the codewords with each input frame, the system further including recognizing means for recognizing the input speech signal as corresponding to one of the acoustic utterances represented by the hidden Markov models, the recognizing means including:

means for decompressing only those probability values associated with codewords of the stored output probability table that are identical to the codewords of the input frames;

means for computing a recognition score for each of the hidden Markov models using the decompressed probability values; and means for determining which hidden Markov model results in a highest recognition score; the acoustic utterance represented by the hidden Markov model with the highest recognition score being recognized as the sound represented by the input speech signal.

14. The data compression system of claim 8, wherein at least some of the hidden Markov models represent whole words of a language.

15. The data compression system of claim 8 wherein a plurality of the plurality of hidden Markov models represent a same word in a vocabulary.

16. A computer storage medium encoded with a data structure for use by a computerized speech recognizer having a plurality of hidden Markov models representing acoustic utterances, the data structure comprising:

a predetermined number of codewords, each codeword representing an acoustic feature; and a probability value associated with each codeword for each hidden Markov model, each probability value reflecting a probability that the acoustic utterance represented by the associated hidden Markov model will be spoken using the acoustic feature represented by the associated codeword, at least some of the probability values associated with a selected codeword being in a compressed form that is based on others of the probability values associated with the selected codeword, the compressed form being such that the probability values associated with the selected codeword can be decompressed by the computerized speech recognizer without decompressing the probability values associated with codewords other than the selected codeword;

computer instructions stored on the computer storage medium, the computer instructions recognizing a sound spoken by a user, the sound spoken being represented by an input speech signal that includes a plurality of input frames, each input frame being associated with one of the codewords, the instructions including:

instructions for decompressing only those probability values associated with the codewords that are identical to the codewords of the input frames without decompressing probability values associated with codewords not identical to the codewords of the input frames;

instructions for computing a recognition score for each of the hidden Markov models using the decompressed probability values; and instructions for determining which hidden Markov model results in a highest recognition score and thereby recognizing the acoustic utterance represented by the hidden Markov model with the highest recognition score as being the spoken sound represented by the input speech signal.

17. A data compression method for a computerized speech recognizer having a plurality of hidden Markov models representing acoustic utterances, comprising:

receiving a plurality of spoken training utterances; and convening the spoken training utterances into an output probability table, the convening step including:

creating a predetermined number of codewords based on the spoken training utterance, each codeword representing an acoustic feature of the spoken training utterances;

creating the hidden Markov models based on the spoken training utterances, each hidden Markov model being created by steps that include associating a probability value with each codeword, each probability value reflecting a probability that the acoustic utterance represented by the hidden Markov model will be spoken using the acoustic feature represented by the associated codeword; and compressing the probability values for each codeword separately from the probability values for other codewords, such that a selected probability value associated with a selected codeword can be decompressed without decompressing the probability values associated with a different, non-selected codeword.

18. The data compression method of claim 17 wherein the compressing step includes:

counting a number of probability values in a run of consecutive identical probability values associated with the selected codeword; and encoding the run of consecutive identical probability values with an identification code that identifies the consecutive identical probability values and a count code that identifies how many consecutive identical probability values are in the run.

19. The data compression method of claim 17, further including quantizing the probability values into buckets before compressing the probability values associated with each codeword, each bucket representing a range of probability values.

20. The data compression method of claim 19 wherein the quantizing step includes quantizing the probability values into 16 buckets.

21. The data compression method of claim 19, further including dynamically adjusting the ranges of the buckets according to the number of probability values coming within each range.

22. The data compression method of claim 17, further including:

inputting an input speech signal that represents a sound spoken by a user; converting the input speech signal into a string of input frames; associating one of the codewords with each input frame; for each input frame: decompressing only those probability values associated with a codeword of the stored output probability table that is identical to the codeword of the input frame; and computing a recognition score for each of the hidden Markov models using the decompressed probability values; and determining which hidden Markov model results in a highest recognition score based on the computing step, the acoustic utterance represented by the hidden Markov model with the highest recognition score being recognized as the sound represented by the input speech signal.

23. The data compression method of claim 17, wherein the hidden Markov models represent whole words of a language.

24. A data compression method for a computerized speech recognizer having a plurality of utterance models, each utterance model representing a speech utterance, each utterance model being associated with a probability value for each of a plurality of acoustic features, each probability value reflecting a probability that the speech utterance represented by the associated utterance model will be spoken using the associated acoustic feature, each acoustic utterance being represented by a codeword, the method comprising:

retrieving the probability values for all the utterance models for a selected codeword;

encoding the retrieved probability values independently from the probability values for codewords other than the selected codeword, such that the encoded probability values for the selected codeword can be decoded without decoding the probability values associated with a different, non-selected codeword;

storing the encoded probability values; and recognizing an input speech utterance using the stored encoded probability values.

25. The data compression method of claim 24 wherein the input speech utterance includes the acoustic feature represented by the selected codeword and the recognizing step includes decoding the probability values for the selected codeword without decoding the probability values associated with a different, non-selected codeword.

26. A speech recognition method for recognizing an input speech utterance spoken by a user, the method employing a computerized speech recognizer having a plurality of utterance models representing speech utterances, the computerized speech recognizer including a compressed output probability table having, for each utterance model, a probability value for each codeword in a set of codewords representing acoustic features, each probability value reflecting a probability that the speech utterance represented by the utterance model for the probability value will be spoken using the acoustic feature represented by the codeword for the probability value, at least some of the probability values for each codeword being compressed, the method comprising:

inputting a speech signal representing the input speech utterance, the speech signal including a sequence of input frames, each input frame representing a sound of the input speech utterance;

for each input frame:

determining which of the codewords most closely matches the sound represented by the input frame;

decompressing only those probability values for the codeword that is determined to most closely match the sound represented by the input frame without decompressing the probability values for the codewords that do not most closely match the sound represented by the input frame; and computing a recognition score for each of the utterance models using the decompressed probability values, the recognition score for each of the utterance models being updated with each input frame; and determining which utterance model results in a highest recognition score based on the computing step; the speech utterance represented by the utterance model with the highest recognition score being recognized as the input speech utterance.

* * * * *

UNITED STATES PATENT AND TRADEMARK OFFICE
CERTIFICATE OF CORRECTION

PATENT NO. : 5,627,939
DATED : May 6, 1997
INVENTOR(S) : Xuedong Huang and Shenzhi Zhang It is certified that error appears in the above-indentified patent and that said Letters Patent is hereby corrected as shown below:

In column 7, claim 1, line 5, please delete "convening", and insert --converting--.

In column 7, claim 1, line 6, following "the", please delete "convening", and insert --converting--.

In column 8, claim 6, line 4, following "user;", please delete "convening", and insert --converting--.

In column 9, claim 13, line 3, following "the", please delete "convening", and insert --converting--.

In column 9, claim 13, line 4, following "for", please delete "convening", and insert --converting--.

In column 10, claim 17, line 5, please delete "convening", and insert --converting--,

UNITED STATES PATENT AND TRADEMARK OFFICE
CERTIFICATE OF CORRECTION

PATENT NO. : 5,627,939
DATED : May 6, 1997
INVENTOR(S) : Xuedong Huang and Shenshi Zhang It is certified that error appears in the above-indentified patent and that said Letters Patent is hereby corrected as shown below:

In column 10, claim 17, line 6, following "the", please delete "convening", and insert --converting--.

Signed and Sealed this

Thirtieth Day of September, 1997

*Attest:*

BRUCE LEHMAN

*Attesting Officer*  *Commissioner of Patents and Trademarks*